(12) United States Patent
Brazier et al.

(10) Patent No.: US 9,791,035 B2
(45) Date of Patent: Oct. 17, 2017

(54) DROPCASE SUSPENSION ASSEMBLY FOR A MOTORIZED VEHICLE

(71) Applicant: Altoz, Inc, Greenbush, MN (US)

(72) Inventors: Dennis Brazier, Greenbush, MN (US); Mark Reese, Roseau, MN (US)

(73) Assignee: Altoz, Inc., Greenbush, MN (US)

( * ) Notice: Subject to any disclaimer, the term of this patent is extended or adjusted under 35 U.S.C. 154(b) by 0 days.

(21) Appl. No.: 14/448,525

(22) Filed: Jul. 31, 2014

(65) Prior Publication Data

US 2016/0031319 A1 Feb. 4, 2016

(51) Int. Cl.
*F16H 57/025* (2012.01)

(52) U.S. Cl.
CPC .................. *F16H 57/025* (2013.01)

(58) Field of Classification Search
CPC ...... B60K 17/00; B60K 17/105; A01D 34/00; F16H 2700/00; F16H 31/02
USPC .......................................................... 60/485
See application file for complete search history.

(56) References Cited

U.S. PATENT DOCUMENTS

| | | | |
|---|---|---|---|
| 5,050,699 A | 9/1991 | Savard | |
| 5,975,226 A * | 11/1999 | Matsumoto | B60K 5/00 180/9.1 |
| 6,578,656 B2 * | 6/2003 | Samejima | A01D 69/03 180/291 |
| 7,044,258 B2 * | 5/2006 | Lamela | B60K 17/04 180/242 |
| 7,047,736 B1 * | 5/2006 | Langenfeld | F16H 39/14 60/464 |
| 7,311,167 B2 | 12/2007 | Takayangai et al. | |
| 8,689,551 B1 * | 4/2014 | Phanco | B60K 17/105 60/484 |
| 2003/0010561 A1 | 1/2003 | Bartel | |
| 2003/0062212 A1 * | 4/2003 | Samejima | A01D 69/03 180/305 |
| 2003/0125859 A1 * | 7/2003 | Dix | B60G 3/14 701/50 |
| 2004/0124030 A1 * | 7/2004 | Lamela | B60K 17/04 180/305 |
| 2005/0045390 A1 * | 3/2005 | Lamela | B60G 5/02 180/24.11 |

(Continued)

FOREIGN PATENT DOCUMENTS

CN 102848895 A 1/2013
WO WO 2012166123 A1 * 12/2012 ............. A01D 69/06

*Primary Examiner* — Karen Beck
(74) *Attorney, Agent, or Firm* — Lowe Graham Jones PLLC

(57) ABSTRACT

A suspension assembly for a motorized vehicle includes a rotatable drive-unit driveshaft extending outwardly from an aperture of a drive unit. A first portion of a dropcase is pivotally coupled to the drive unit. A first end portion of a dropcase driveshaft is coupled to the drive-unit driveshaft such that rotation of the drive-unit driveshaft causes a corresponding rotation of the dropcase driveshaft. A second end portion of the dropcase driveshaft extends outwardly from a second portion of the dropcase and is suitable for coupling to a wheel hub. A pivotal-coupling assembly pivotally couples the dropcase to the drive unit. The pivotal-coupling assembly provides a pivot axis between the dropcase and the drive unit along a longitudinal length of the drive-unit driveshaft.

19 Claims, 11 Drawing Sheets

(56) References Cited

U.S. PATENT DOCUMENTS

| | | | | |
|---|---|---|---|---|
| 2005/0126333 | A1* | 6/2005 | Dohles | B60J 7/10 |
| | | | | 74/606 R |
| 2006/0058138 | A1* | 3/2006 | Morita | F16H 9/18 |
| | | | | 474/144 |
| 2012/0272763 | A1* | 11/2012 | Murakami | F16H 57/025 |
| | | | | 74/412 R |
| 2013/0291509 | A1* | 11/2013 | Weber | A01D 34/64 |
| | | | | 56/15.8 |
| 2015/0192110 | A1* | 7/2015 | Pedersen | F16H 1/227 |
| | | | | 475/149 |
| 2016/0361997 | A1* | 12/2016 | Melone | B60G 9/00 |

* cited by examiner

DROPCASE SUSPENSION ASSEMBLY FOR A MOTORIZED VEHICLE

FIELD OF THE INVENTION

The present invention is directed to suspension systems for motorized vehicles. The present invention is also directed to suspension systems that include dropcases pivotally coupled to components of hydraulic drive systems of motorized vehicles.

BACKGROUND OF THE INVENTION

Suspensions may connect two or more mechanical components together such that some amount of relative motion is enabled between the components. Many vehicles, including at least some motorized vehicles, make use of suspensions to connect the vehicle chassis to its wheels. As known in the art, suspensions may be used to isolate (e.g., absorb) at least some of the bumps encountered by the wheels during operation of the vehicle. Such isolation may provide a smoother, more comfortable riding experience during operation of the vehicle. Additionally, such isolation may also improve handling of the vehicle. For example, such isolation may improve steering, braking, or both. Moreover, such isolation may reduce wear and damage to the vehicle.

SUMMARY OF THE INVENTION

In one embodiment, a suspension assembly for a motorized vehicle includes a drive unit defining a drive-unit output aperture. A rotatable drive-unit driveshaft has a longitudinal length and a distal end portion extending outwardly from the drive unit through the drive-unit output aperture. A dropcase, such as a gearbox, has a first end portion and a second end portion opposite to the first end portion. The first end portion of the dropcase is pivotally coupled to the drive unit. A dropcase driveshaft has a first end portion and an opposing second end portion. The first end portion is coupled to the drive-unit driveshaft such that rotation of the drive-unit driveshaft causes a corresponding rotation of the dropcase driveshaft. The second end portion extends outwardly from the second end portion of the dropcase and is configured and arranged to couple to a wheel hub. The dropcase driveshaft is offset from the drive-unit driveshaft along the longitudinal length of the dropcase. A pivotal-coupling assembly pivotally couples the dropcase to the drive unit. The pivotal-coupling assembly provides a pivot axis between the dropcase and the drive unit along the longitudinal length of the drive-unit driveshaft.

In another embodiment, a motorized vehicle has a longitudinal axis and includes a chassis; an engine coupled to the chassis; and a first wheel coupled to the chassis. The first wheel includes a first wheel hub coupled to the engine such that power generated by the engine turns the wheel hub. The first wheel also includes a rim coupled the first wheel hub and configured and arranged to receive a tire. The motorized vehicle also includes the suspension assembly described above with the first wheel hub coupled to the second end portion of the dropcase driveshaft of the suspension assembly.

In yet another embodiment, a dropcase for a motorized vehicle includes a rigid outer case having an outer surface, a first end portion, and a second end portion opposite to the first end portion. A pivotal-coupling flange is disposed along the outer surface of the outer case along the first end portion of the dropcase. The pivotal-coupling flange is configured and arranged to couple with a drive unit. An input aperture is defined in the outer case within the input flange. The input aperture is configured and arranged to receive a drive-unit driveshaft extending from the drive unit such that the dropcase pivots about an axis formed by the longitudinal length of the drive-unit driveshaft when the drive-unit driveshaft is received by the input aperture. An output aperture is defined in the outer case along the second end portion of the dropcase. A dropcase driveshaft has a first end portion and an opposing second end portion. The first end portion is disposed in the dropcase and is coupled to the drive-unit driveshaft such that rotation of the drive-unit driveshaft causes a corresponding rotation of the dropcase driveshaft. The second end portion extends out of the dropcase through the output aperture and is configured and arranged to couple to a rotatable wheel hub.

BRIEF DESCRIPTION OF THE DRAWINGS

Preferred and alternative examples of the present invention are described in detail below with reference to the following drawings.

Figure 1:
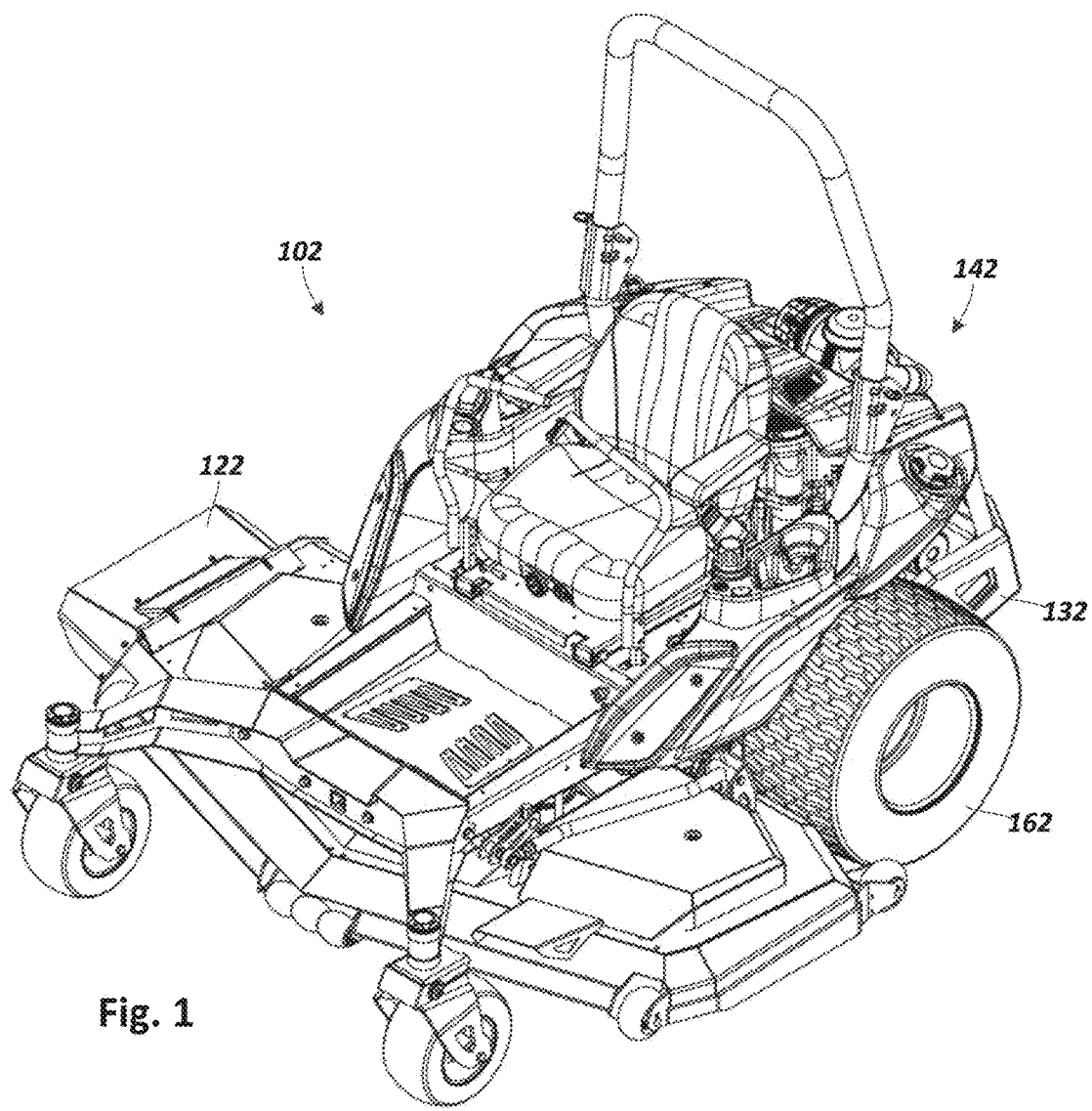
FIG. 1 is a schematic perspective view of one embodiment of a riding lawnmower suitable for employing a suspension assembly, according to the invention.
Figure 4A:
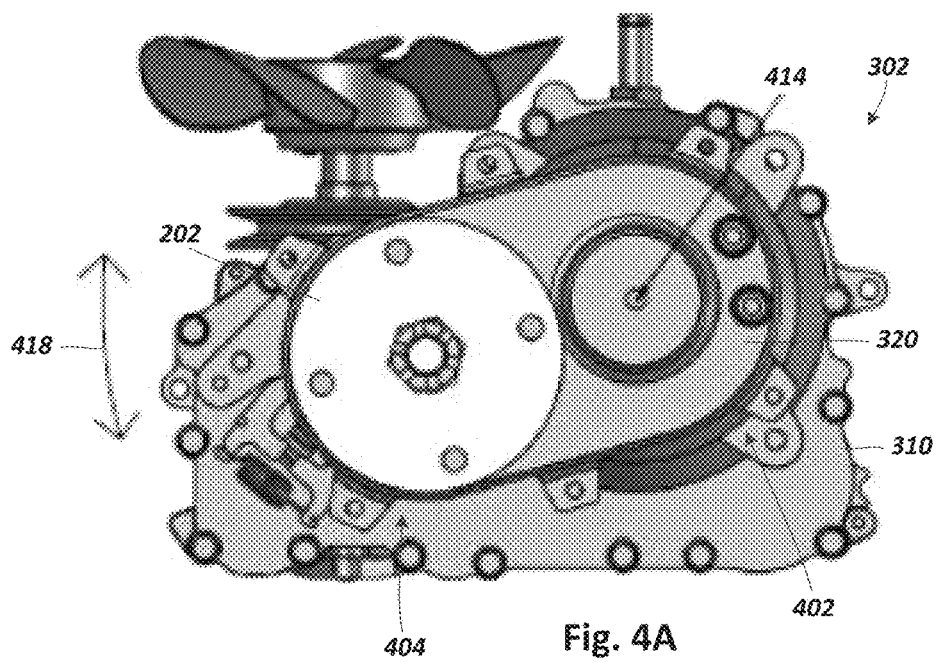
FIG. 4A is a schematic side-elevational view of one embodiment of the suspension assembly of FIG. 3B, the suspension assembly including a dropcase having a first end portion pivotally coupled to a hydrostatic transmission and an opposing second end portion coupled to the wheel hub of FIG. 2, according to the invention.
Figure 4B:
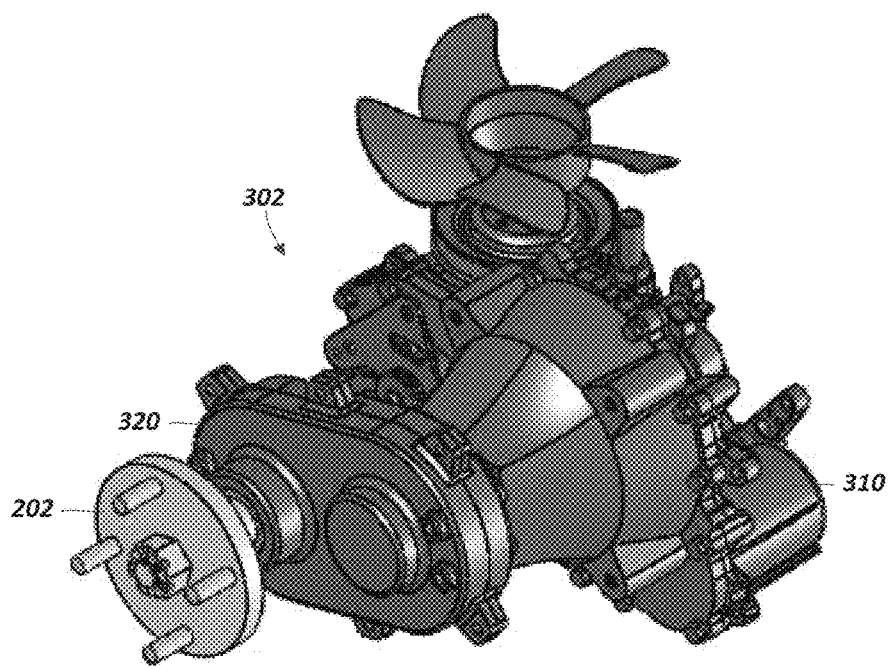
FIG. 4B is a schematic isometric view of one embodiment of the suspension assembly of FIG. 4A, the suspension assembly including a dropcase having a first end portion pivotally coupled to a hydrostatic transmission and an opposing second end portion coupled to the wheel hub of FIG. 2, according to the invention.
Figure 7:
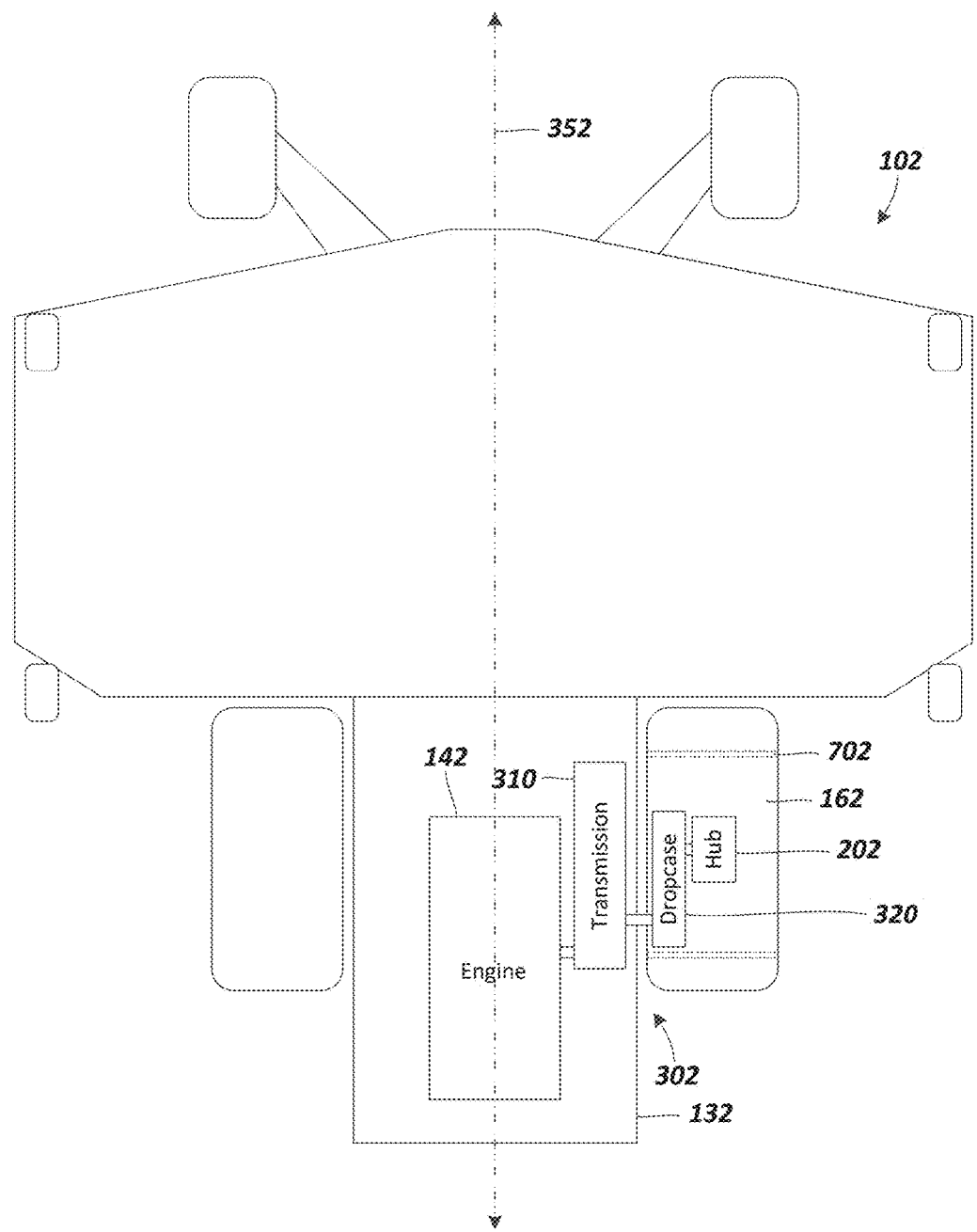
FIG. 7 is a schematic bottom view of another embodiment of the suspension assembly of FIG. 6 disposed in the lawnmower of FIG. 1 and coupled to the wheel hub of FIG.
Figure 8:
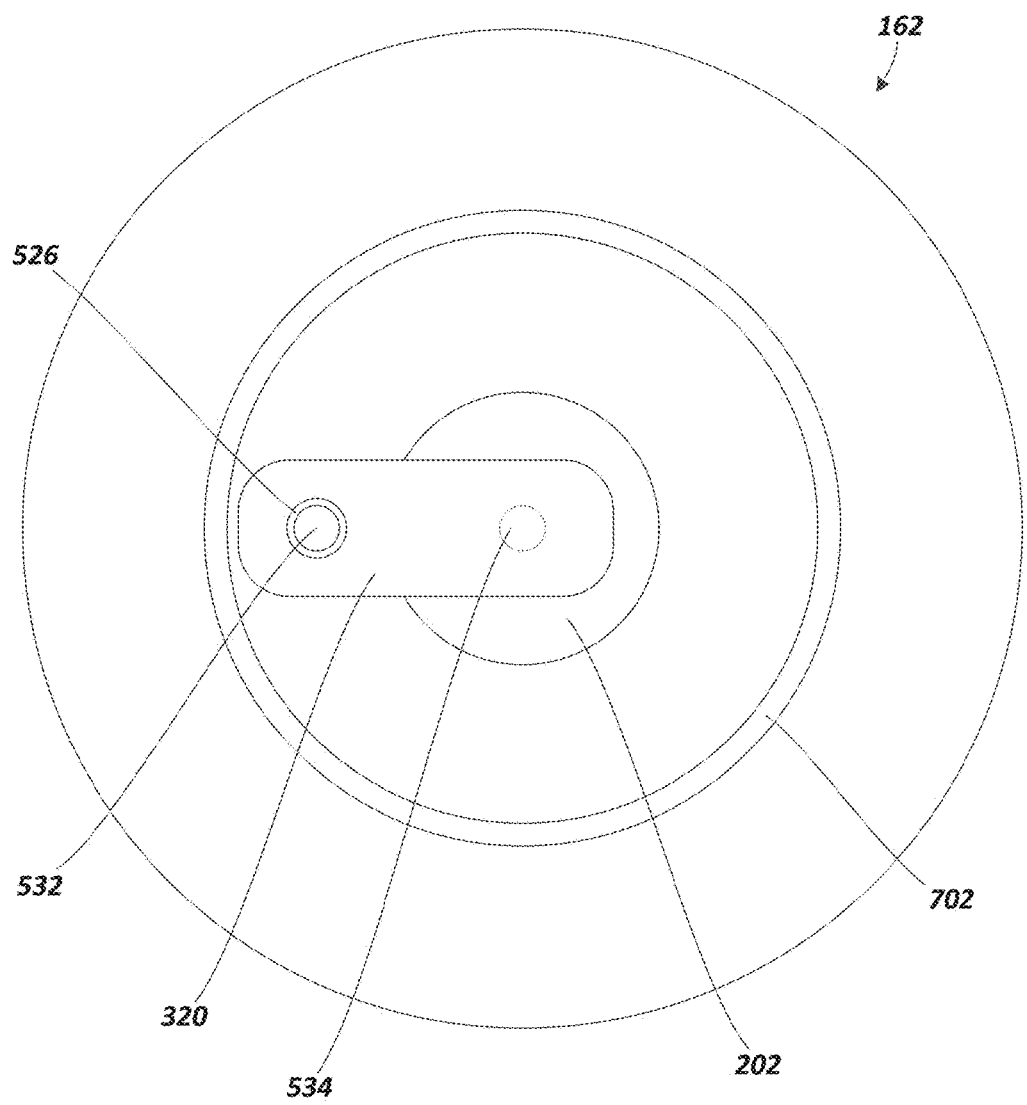
Figure 9:
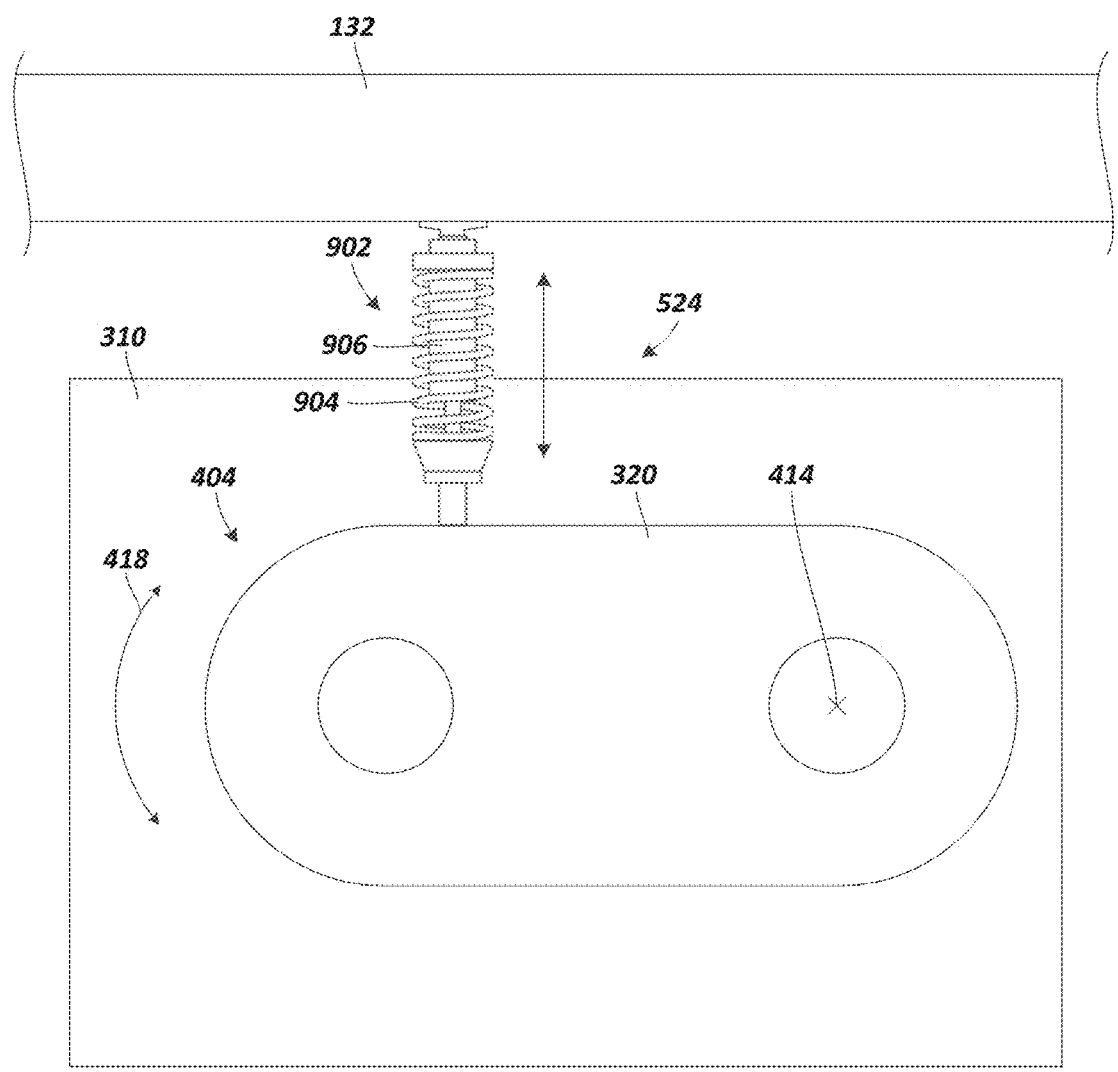

2 such that the dropcase of the suspension assembly is disposed within a rim of a wheel of the lawnmower, according to the invention;

FIG. 8 is a schematic side-elevational view of one embodiment of the dropcase of the suspension assembly of FIG. 7 disposed in the rim of the wheel of the lawnmower of FIG. 7, according to the invention; and FIG. 9 is a schematic side-elevational view of an alternate embodiment of the suspension assembly of FIGS. 4A-4B with a dropcase coupled to the chassis of the lawnmower of FIG. 1 via a coil-over spring-and-damper assembly, according to the invention.

DETAILED DESCRIPTION OF THE PREFERRED EMBODIMENT

The present invention is directed to suspension systems for motorized vehicles. The present invention is also directed to suspension systems that include dropcases pivotally coupled to components of hydraulic drive systems of motorized vehicles. In at least some embodiments, the hydraulic drive system includes a hydrostatic transmission with a hydraulic pump and motor disposed in a common housing.

The suspension assembly can be used with any suitable motorized vehicle including, for example, cars, trucks, lawnmowers, skid-steer vehicles, or the like. The present invention is described herein using a riding lawnmower as the motorized vehicle ("vehicle") into which the described suspension assembly can be disposed. The riding lawnmower is exemplary and is not meant to be limiting.

FIG. 1 illustrates, in perspective view, one embodiment of a lawnmower 102. The lawnmower 102 includes a deck 122 partially covering lawnmower blades (not shown), a chassis 132, an engine 142 coupled to the chassis 132, and one or more wheels, such as wheel 162, driven by the engine 142. In FIG. 1 (and in other figures), the driven wheels are shown as being rear wheels. It will be understood that the driven wheels are not limited to rear wheels and may include, for example, one or more front wheels. In at least some embodiments, the lawnmower 102 uses one or more hydrostatic transmissions (310 in FIG. 3A) to drive the wheels 16, via power supplied by the engine 142.

Figure 2:
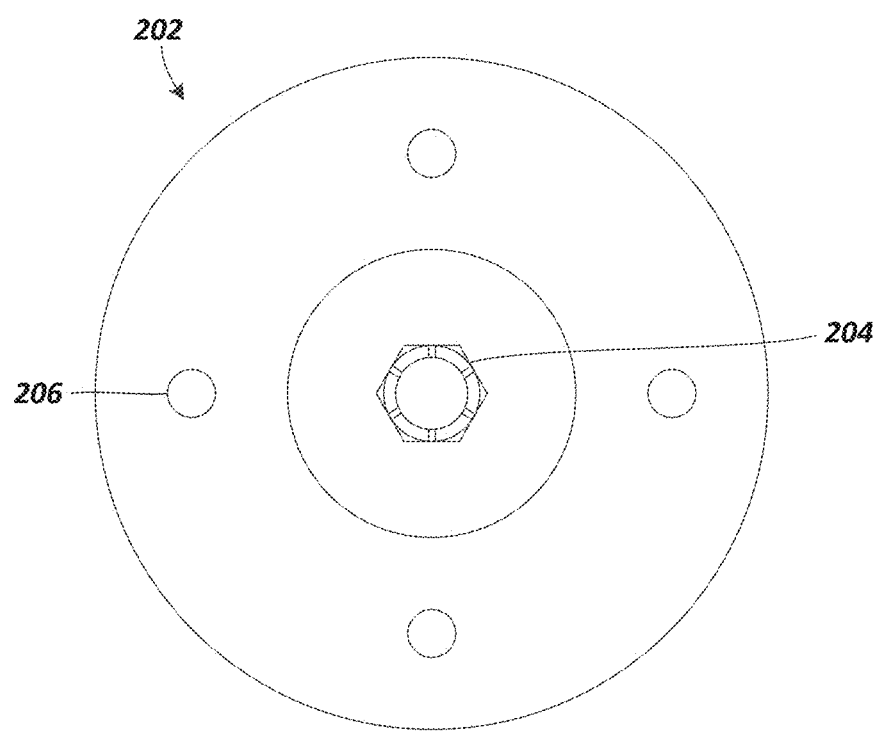
FIG. 2 is a schematic close-up perspective view of one embodiment of a wheel hub suitable for use with the lawnmower of FIG. 1, according to the invention.

FIG. 2 illustrates, in close-up perspective view, one embodiment of a wheel hub 202 suitable for use with the lawnmower 102. The wheel hub 202 includes a driveshaft coupler 204 for coupling the wheel hub 202 to a driveshaft in communication with the engine 142. The wheel hub 202 further includes one or more fasteners, such as fastener 206, for coupling the wheel 162 to the wheel hub 202. When the wheel hub 202 is attached to the wheel 162, rotation of the wheel hub 202 causes a corresponding rotation of the wheel 162, thereby enabling linear motion of the lawnmower 102 when the wheel 162 contacts a drivable surface.

Figure 3A:
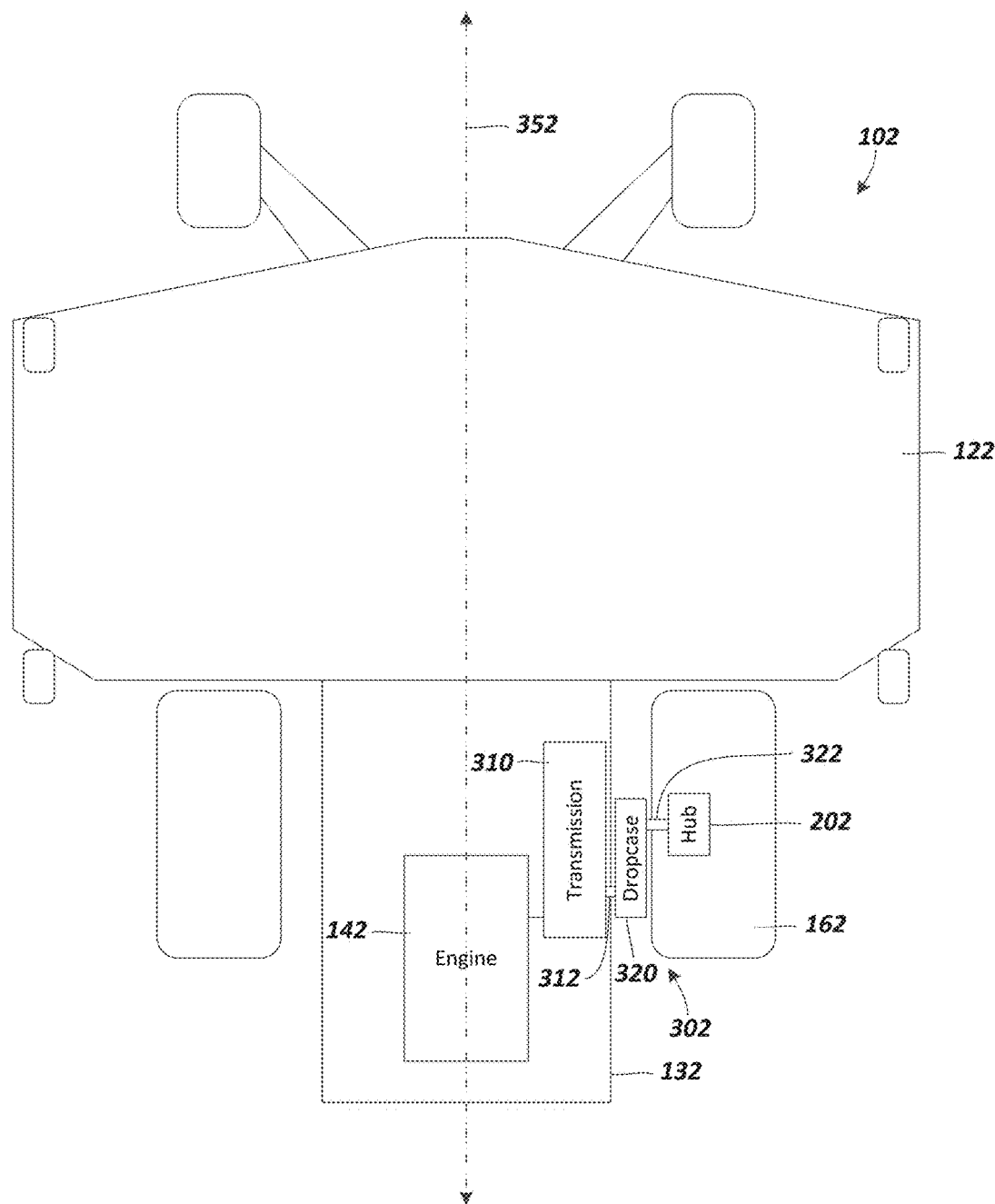
FIG. 3A is a schematic bottom view of one embodiment of a suspension assembly disposed in the lawnmower of FIG. 1, according to the invention.

Turning to FIG. 3A, vehicles, such as lawnmowers, may traverse terrain that is bumpy, choppy, rutted, or the like. In some instances, the vehicle may not have any suspension at all, or may have a suspension system that relies solely on the air pressure in the tires. In which case, the ride may be rough and uncomfortable for the driver and any passengers. In some instances, the vehicle may be difficult to handle (e.g., steer, accelerate, brake, or the like), or may not perform a function (e.g., mowing, hauling, scooping, towing, or the like) to its full capability, or both.

For at least these reasons, it may be useful to dispose a suspension between the driven wheel(s) 162 and the engine 142. The suspension may reduce the bumpiness associated with traversing uneven terrain, thereby increasing user comfort and handling, as well as reducing wear and tear of the vehicle.

As herein described, a dropcase suspension assembly ("suspension assembly") for a vehicle with a hydraulic drive system is disposed between the engine and the wheel hub of the vehicle. The dropcase suspension assembly includes a dropcase having one or more gears, chains, belts, or the like or combinations thereof, for transferring rotation from one component, such as a first driveshaft coupled to an engine, to another component, such as a second driveshaft coupled to a wheel hub.

In at least some embodiments, the suspension assembly includes a dropcase that is pivotally coupled at one end to a drive unit, such as a hydrostatic transmission that, in turn, is coupled to the engine of the vehicle. The dropcase is coupled at an opposing end to a wheel hub of the vehicle such that rotation of a driveshaft extending from the drive unit is transferred to a driveshaft that extends from the dropcase and that is spatially offset from the drive-unit driveshaft. Rotation of the driveshaft extending from the dropcase is transferred to the wheel hub. Consequently, when a wheel is mounted to the wheel hub, the suspension assembly provides a suspension for the vehicle while enabling rotation of the drive-unit driveshaft to drive rotation of the wheel.

The dropcase is pivotally coupled to the drive unit by a pivotal-coupling assembly and forms a pivot axis about which the dropcase pivots. In at least some embodiments, the pivot axis is along a longitudinal length of the drive-unit driveshaft. The pivoting dropcase functions as a suspension arm to create travel in the wheel hub (i.e., a range of motion in the wheel hub relative the chassis of the vehicle) from the pivotal coupling with the drive unit.

FIG. 3A illustrates, in bottom view, one embodiment of a suspension assembly 302 disposed in the lawnmower 102. The lawnmower 102 has a longitudinal axis, shown in FIG. 3A as a dashed and dotted line 352. The suspension assembly 302 couples the engine 142 to the wheel hub 202. In FIG. 3A, the wheel hub 202 is shown mounted to the driven wheel 162 of the lawnmower 102.

The suspension assembly 302 includes a hydrostatic transmission 310 and a dropcase 320 that is pivotally coupled to the hydrostatic transmission 310. A distal end portion of a rotatable driveshaft ("drive-unit driveshaft") 312 extends outwardly from the hydrostatic transmission 310. In at least some embodiments, the drive-unit driveshaft 312 extends through the chassis 132 of the lawnmower 102.

The distal end portion of the drive-unit driveshaft 312 is coupled to the dropcase 320. In at least some embodiments, the drive-unit driveshaft 312 is coupled directly to the dropcase 320. In at least some embodiments, the drive-unit driveshaft 312 extends in a direction that is perpendicular to the longitudinal axis 352 of the lawnmower 102. As will be discussed in more detail below, with reference to FIGS. 4A-4B, in at least some embodiments an axis formed along the longitudinal length of the drive-unit driveshaft 312 forms the pivot axis about which the dropcase 320 pivots.

A rotatable driveshaft ("dropcase driveshaft") 322 extends outwardly from the dropcase 320 and is coupled to the wheel hub 202. The dropcase 320 has a longitudinal length. In FIG. 3A (and in other figures), the dropcase 320 is shown having a longitudinal length that is parallel to the longitudinal axis 352 of the lawnmower 102. It will be understood that the dropcase need not be parallel to the longitudinal axis 352 of the lawnmower 102. The dropcase driveshaft 322 is spatially offset from the drive-unit driveshaft 312 along the longitudinal length of the dropcase 320.

The dropcase driveshaft 322 is coupled to the drive-unit driveshaft 312 such that rotation of the drive-unit driveshaft 312 causes a corresponding rotation of the dropcase driveshaft 322. Thus, rotation of the drive-unit driveshaft 312 causes rotation of the wheel hub 202, via rotation of the dropcase driveshaft 322. In at least some embodiments, the dropcase driveshaft 322 extends in a direction that is perpendicular to the longitudinal axis 352 of the lawnmower 102. It will be understood that the dropcase driveshaft 322 need not extend in a direction that is perpendicular to the longitudinal axis 352 of the lawnmower 102. In at least some embodiments, the dropcase driveshaft 322 extends in a direction that is parallel to the drive-unit driveshaft 312. In at least some embodiments, at least one of the drive-unit driveshaft 312 or the dropcase driveshaft 322 extends perpendicular to the longitudinal length of the dropcase 320.

The dropcase driveshaft 322 can be disposed either forwardly or rearwardly of the drive-unit driveshaft 312 along the longitudinal axis 352 of the vehicle 102. In FIG. 3A, the drive-unit driveshaft 312 is shown disposed forwardly of the drive-unit driveshaft 312 along the longitudinal axis 352 of the vehicle 102. Alternately, as shown in FIG. 3B, the drive-unit driveshaft 312 can be disposed rearwardly of the drive-unit driveshaft 312 along the longitudinal axis 352 of the vehicle 102.

Figure 3B:
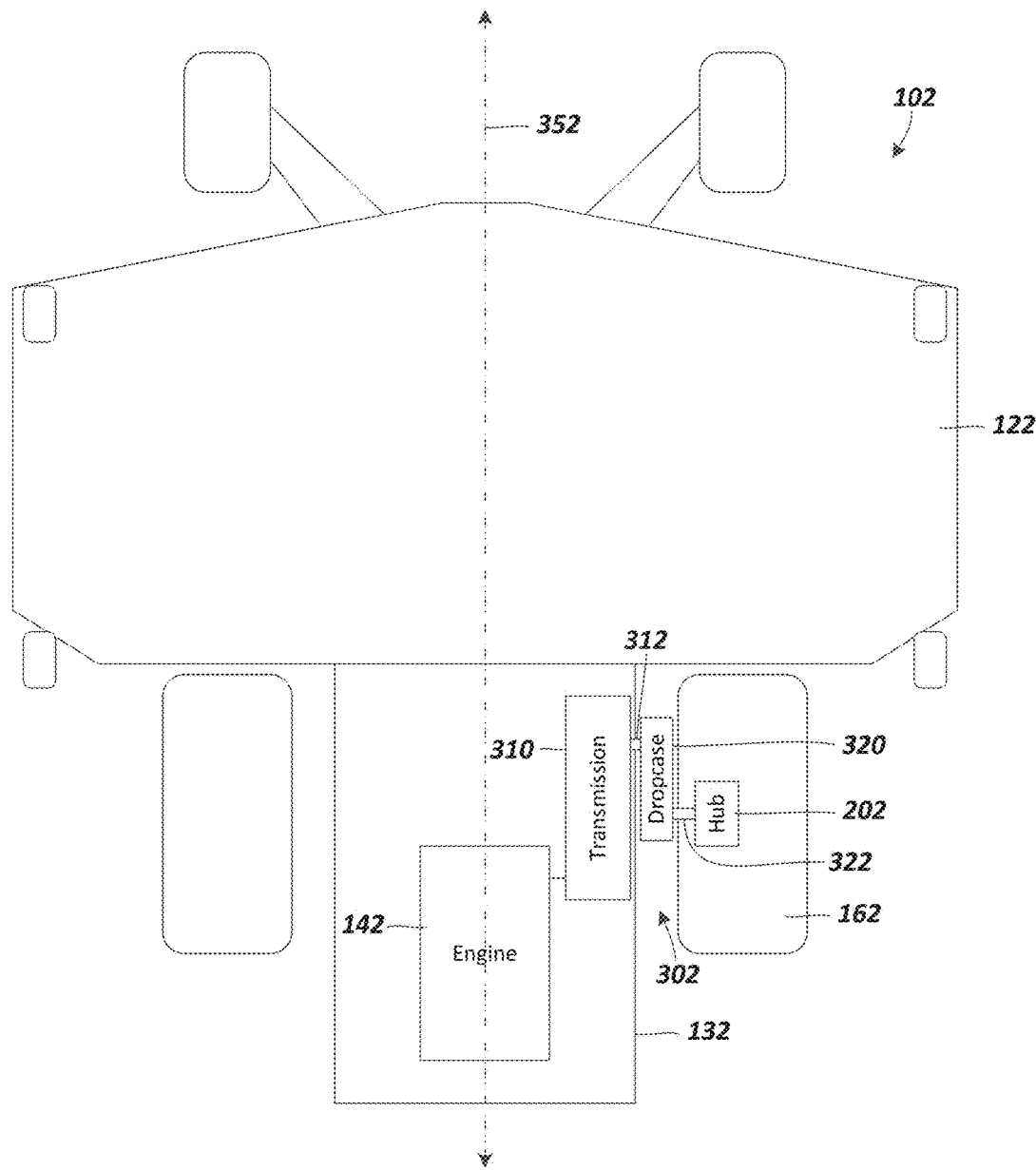
FIG. 3B is a schematic bottom view of another embodiment of the suspension assembly of FIG. 3A disposed in the lawnmower of FIG. 1, according to the invention.
Figure 3C:
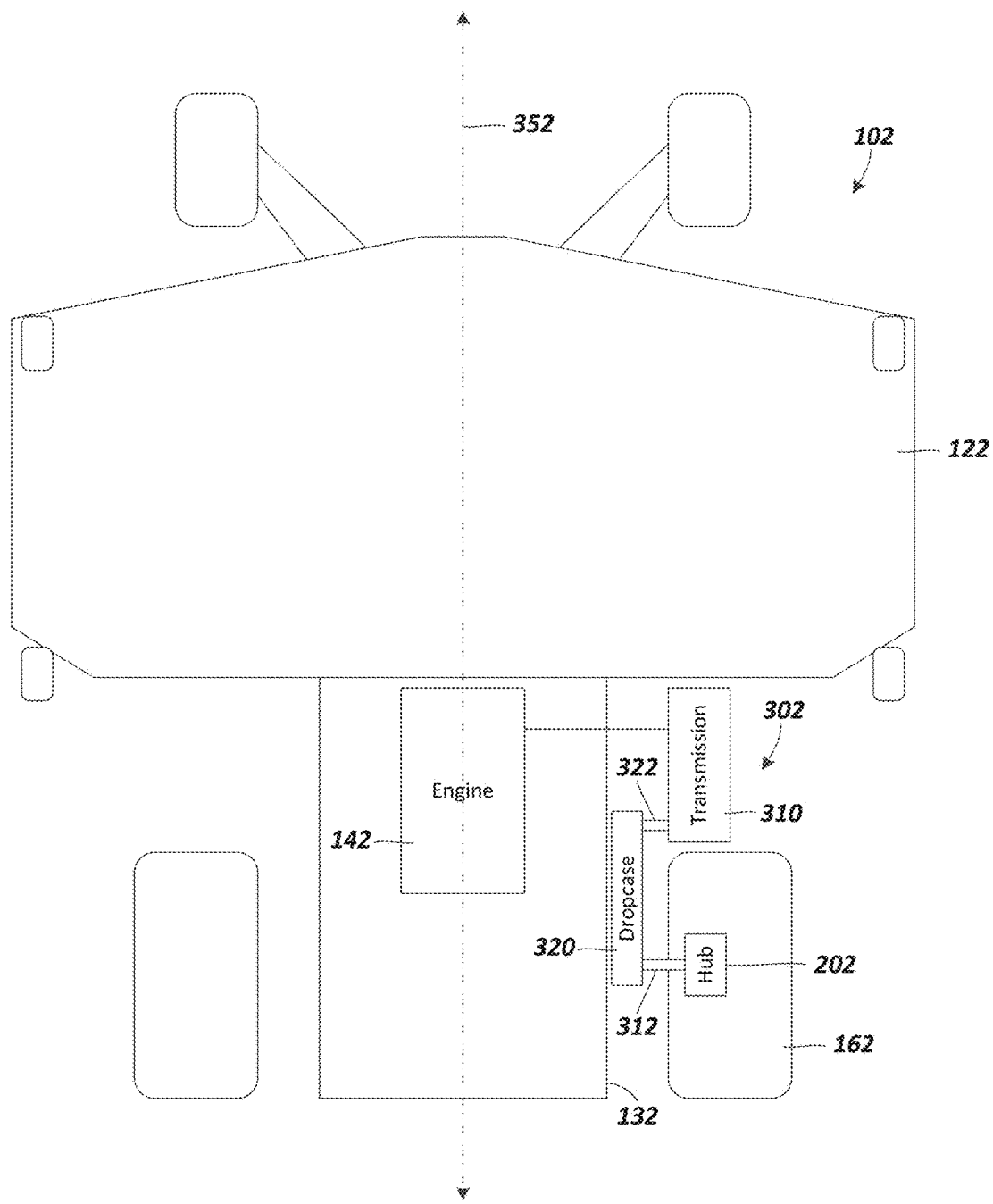
FIG. 3C is a schematic bottom view of yet another embodiment of the suspension assembly of FIG. 3A disposed in the lawnmower of FIG. 1, according to the invention.

Turning to FIG. 3C, the dropcase 320 may have opposing major surfaces. In at least some embodiments, the major surfaces of the dropcase are parallel to one another. In at least some embodiments, the major surfaces of the dropcase extend along the longitudinal length of the dropcase 320. In FIGS. 3A-3B (and in other figures) the drive-unit driveshaft 312 and the dropcase driveshaft 322 are shown extending from opposing major surfaces of the dropcase 320. In alternate embodiments, the drive-unit driveshaft 312 and the dropcase driveshaft 322 each extend from the same major surface of the dropcase 320.

FIG. 3C shows one embodiment of the drive-unit driveshaft 312 and the dropcase driveshaft 322 extending from the same major surface of the dropcase 320. In FIG. 3C, the hydrostatic transmission 310 is shown disposed forward from the wheel 162 along the longitudinal axis of the lawnmower 102. It will be understood that the hydrostatic transmission 310 can, alternately, be disposed rearward of the wheel 162 along the longitudinal axis of the lawnmower 102. Moreover, the hydrostatic transmission 310 can also (or alternatively) be disposed above or below the wheel 162.

Figure 3D:
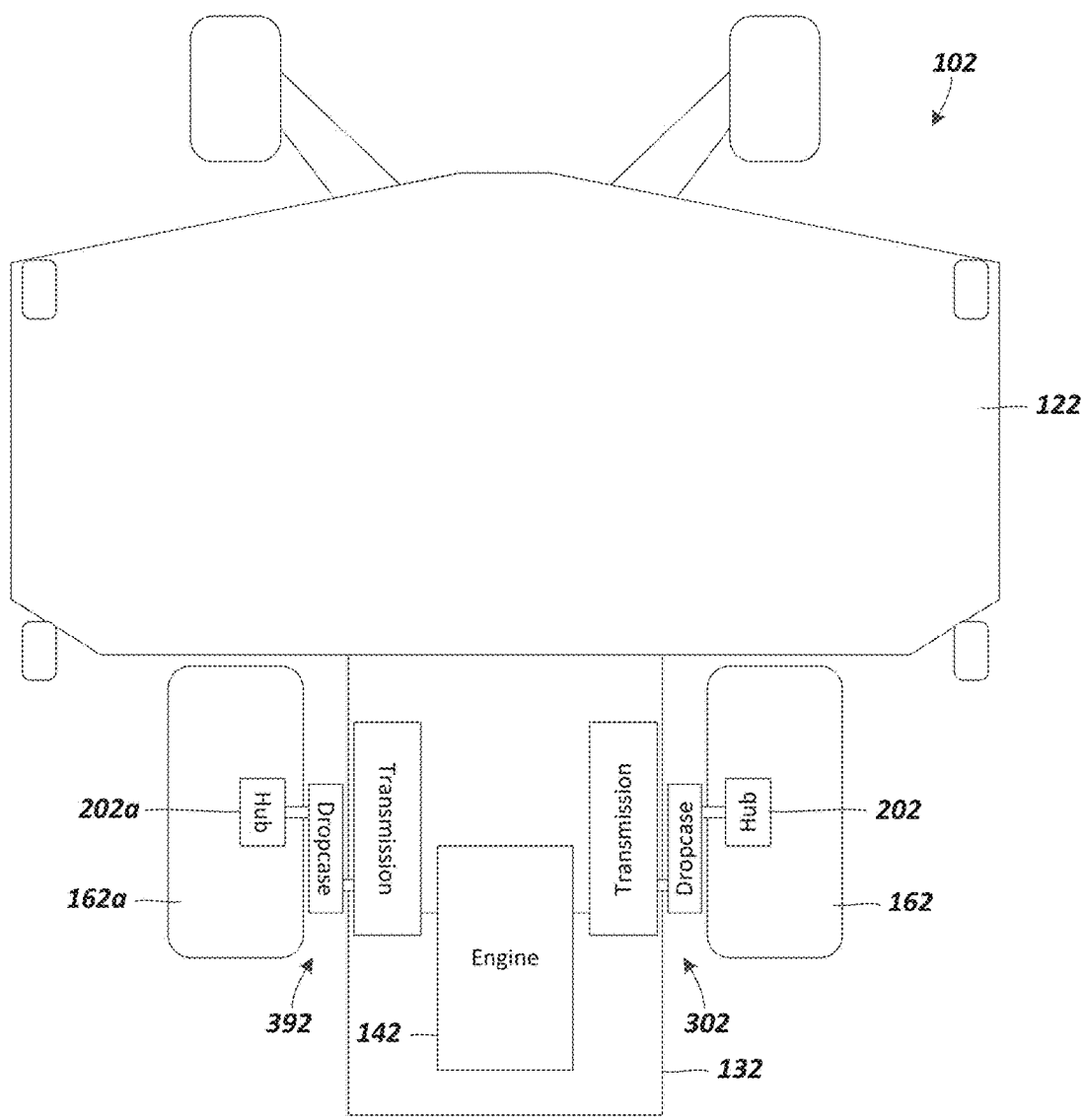
FIG. 3D is a schematic bottom view of one embodiment of the lawnmower of FIG. 1 with multiple suspension assemblies disposed in the lawnmower, according to the invention.

In FIGS. 3A-3C (and in other figures), a single suspension assembly 302 is shown disposed in the vehicle. It will be understood that any suitable number of suspension assemblies 302 may be disposed in a vehicle. FIG. 3D shows two suspension assemblies 302 and 392 disposed in the vehicle 102. FIG. 3D shows the suspension assembly 302 coupled to the wheel hub 202 of the wheel 162, as was shown in FIG. 3A. FIG. 3D also shows a second suspension assembly 392 coupled to another wheel hub 202a of another driven wheel 162a of the vehicle 102. In at least some embodiments, a different suspension assembly is coupled to each driven wheel of the vehicle. When, as shown in FIG. 3D, the suspension assemblies are disposed along opposing sides of the vehicle, the suspension assemblies may be mirror images of one another along the longitudinal axis 352 of the lawnmower 102 with the dropcase transmissions disposed either forwardly or rearwardly of the drive-unit driveshaft 312.

FIG. 4A and FIG. 4B illustrate, in side-elevational and isometric views, respectively, one embodiment of the hydrostatic transmission 310 and dropcase 320 of the dropcase suspension assembly 302, as shown in FIG. 3B. The dropcase 320 functions as a suspension arm having a first end portion 402 and an opposing second end portion 404. As shown in FIGS. 4A-4B, the dropcase 320 is pivotally coupled to the hydrostatic transmission 310 along the first end portion 402 of the dropcase 320 and coupled along the second end portion 404 to the wheel hub 202. In at least some embodiments, the second end portion 404 of the dropcase 320 is fixedly coupled to the wheel hub 202.

As shown in FIG. 4A, the dropcase 320 pivots along a pivot axis 414 formed along the first end portion 402 of the dropcase 320. In at least some embodiments, the pivot axis 414 is formed along a longitudinal length of the drive-unit driveshaft 312. Pivoting of the dropcase 320 along the pivot axis 414 causes rotational movement of the second end portion 404 of the dropcase 320, as shown by two-headed directional arrow 418. The rotational movement of the second end portion 404 of the dropcase 320 causes the dropcase driveshaft (322 in FIG. 3B) to move relative the chassis 132 of the vehicle 102, to which the engine 142 is mounted. When the dropcase driveshaft 322 is coupled to one of the wheels 162 of the vehicle, via the wheel hub 202, the rotational movement of the second end portion 404 of the dropcase 320 causes the wheel 162 to move relative to the chassis 132 of the vehicle, thereby reducing, or even eliminating, jostling of the vehicle caused when the vehicle traverses rough or uneven traversed terrain.

The relative movement (i.e., travel) of the wheel 162 to the chassis 132 caused by the pivoting of the dropcase 320 can be affected by several different factors including, for example, the amount of pivot of the dropcase 320 relative to the hydrostatic transmission 310, and the linear distance between the pivot axis 414 and the dropcase driveshaft 322.

The suspension system 302 can be adjusted to form any suitable amount of travel. In at least some embodiments, the travel is at least one inch (about 2.5 cm), two inches (about 5 cm), three inches (about 7.5 cm), four inches (about 10 cm), five inches (about 12.5 cm), six inches (about 15 cm), or more.

Figure 5:
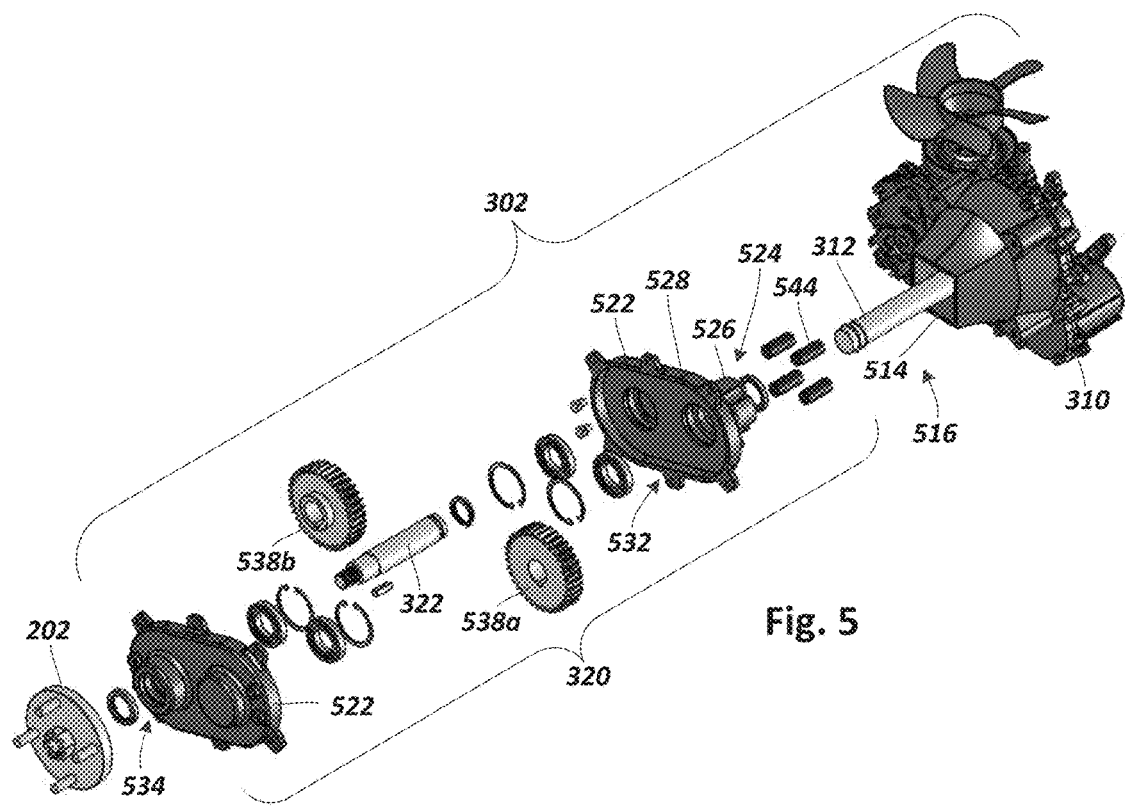
FIG. 5 is a schematic isometric, exploded view of one embodiment of the suspension assembly and the wheel hub of FIGS. 4A-4B, according to the invention.

FIG. 5 illustrates, in isometric view, one embodiment of the suspension assembly 302 and the wheel hub 202, with the suspension assembly 302 shown in exploded view. The hydrostatic transmission 310 defines a drive-unit output aperture 514 through which a distal end portion 516 of the drive-unit driveshaft 312 extends.

An outer case 522 with an outer surface 528 encloses the dropcase 320. In at least some embodiments, the outer case 522 is formed from one or more rigid materials. In FIG. 5, the outer case 522 is shown in two pieces. It will be understood that the outer case 522 can be formed in a single piece, or in any suitable number of multiple pieces. In at least some embodiments, the dropcase 320 does not have an outer case 522.

An input aperture 532 extends through the outer case 522. The input aperture 532 is suitable for receiving the distal end portion 516 of the drive-unit driveshaft 312. An output aperture 534 extends through an opposing end portion of the dropcase 320 from the input aperture 532. The dropcase driveshaft 322 extends through the output aperture 534 and is suitable for coupling to the wheel hub 202. In some embodiments, the input aperture 532 and the output aperture 534 are defined along opposing major surfaces of the dropcase 320 from one another (see e.g., FIGS. 3A-3B). In other embodiments, the input aperture 532 and the output aperture 534 are defined along the same major surface of the dropcase 320 from one another (see e.g., FIG. 3C).

The drive-unit driveshaft 312 is coupled to the dropcase driveshaft 322 such that rotation of the drive-unit driveshaft 312 causes a corresponding rotation of the dropcase driveshaft 322. The drive-unit driveshaft 312 can be coupled to the dropcase driveshaft 322 in any suitable manner for transferring rotation (e.g., gears, chains, belts, or the like).

In at least some embodiments, the drive-unit driveshaft 312 is coupled to the dropcase driveshaft 322 by gears, such as gears 538a and 538b. In at least some embodiments, gear 538a is fixedly coupled to the drive-unit driveshaft 312 and the gear 538b is fixedly coupled to the dropcase driveshaft 322. The gear 538a and the gear 538b may be rotationally coupled to one another either directly, or indirectly via one or more components, such as one or more additional gears. In FIG. 5, two gears are shown. It will be understood that any suitable number of gears may be used.

The gears may be configured to transfer rotation at any suitable gear ratio. In FIG. 5, the gears are shown having a 1:1 gear ratio, such that one revolution of the drive-unit driveshaft 312 causes one corresponding revolution of the dropcase driveshaft 322. Other gear ratios may be used, such that one revolution of the drive-unit driveshaft 312 causes more or less than one corresponding revolution of the dropcase driveshaft 322.

A pivotal-coupling assembly 524 pivotally couples the dropcase 320 to the hydrostatic transmission 310. The pivotal-coupling assembly 524 may, optionally, include a flange inserted into an aperture. In at least some embodiments (and as shown in FIG. 5 and in other figures), a flange 526 is disposed along the outer surface 528 of the outer case 522 and is suitable for insertion into the drive-unit output aperture 514 of the hydrostatic transmission 320. In alternate embodiments, the flange is disposed on the hydrostatic transmission around the drive-unit output aperture 514 and is suitable for insertion into the input aperture 532 of the dropcase 320.

Thus, in at least some embodiments, the dropcase 320 pivotally couples with the hydrostatic transmission 310 via the pivotal-coupling assembly 524. Meanwhile, the drive-unit driveshaft 312 extends through the pivotal-coupling assembly 524 such that the longitudinal length of the drive-unit driveshaft 312 forms the pivot axis 414 (shown in FIG. 4A).

The pivotal-coupling assembly 524, optionally, includes one or more blocks, such as block 544, that are disposed along an outer surface of the flange 526 such that, when the flange 526 is inserted into the aperture (the drive-unit output aperture 514 or the dropcase input aperture 532) the one or more blocks 544 are disposed between the flange 526 and the aperture. The blocks can be formed from any suitable pliable (i.e., compressible) material(s) including, for example, torsilastic molded materials, elastomeric materials, or the like or combinations thereof.

The blocks 544 function to regulate the amount of pivot between the dropcase 320 and the hydrostatic transmission 310 about the pivot axis (414 in FIG. 4A), thereby regulating the rotational movement of the dropcase driveshaft 322 and the corresponding amount of travel of a wheel coupled to the dropcase driveshaft 322. In at least some embodiments, the compressibility of the blocks 544 controls the amount of pivot. The higher the compressibility of the blocks 544, the greater the amount of pivot (and the greater the amount of rotational movement of the dropcase driveshaft 322). Conversely, the lower the compressibility of the blocks 544, the less the amount of pivot. Depending on the material of the blocks 544, they may perform the functions of both a spring and a damper.

In at least some embodiments, the flange 526 has a rounded shape and is adapted to receive four blocks arranged ninety degrees apart from one another. For example, in at least some embodiments the rounded flange 526 defines indentations that are spaced ninety degrees apart from one another and that each receive a different block such that the block maintains its rotational position about the flange 526. In at least some embodiments, the aperture into which the flange 526 is inserted (the drive-unit output aperture 514 or the dropcase input aperture 532) has a rectangular-shaped opening such that, when the flange 526 is disposed in the rectangular-shaped opening 514 or 532, the blocks 544 are disposed along the corners of the aperture 514 or 532. It will be understood that the aperture into which the flange 526 is inserted can have any shape suitable for corresponding the flange 526 including, for example, circular, elliptical, triangular, pentagonal, hexagonal, heptagonal, octagonal, cruciform (with legs of either equal or unequal length), star-shaped, or the like. Additionally, it will be understood that the aperture may be a non-regular geometric shape.

Figure 6:
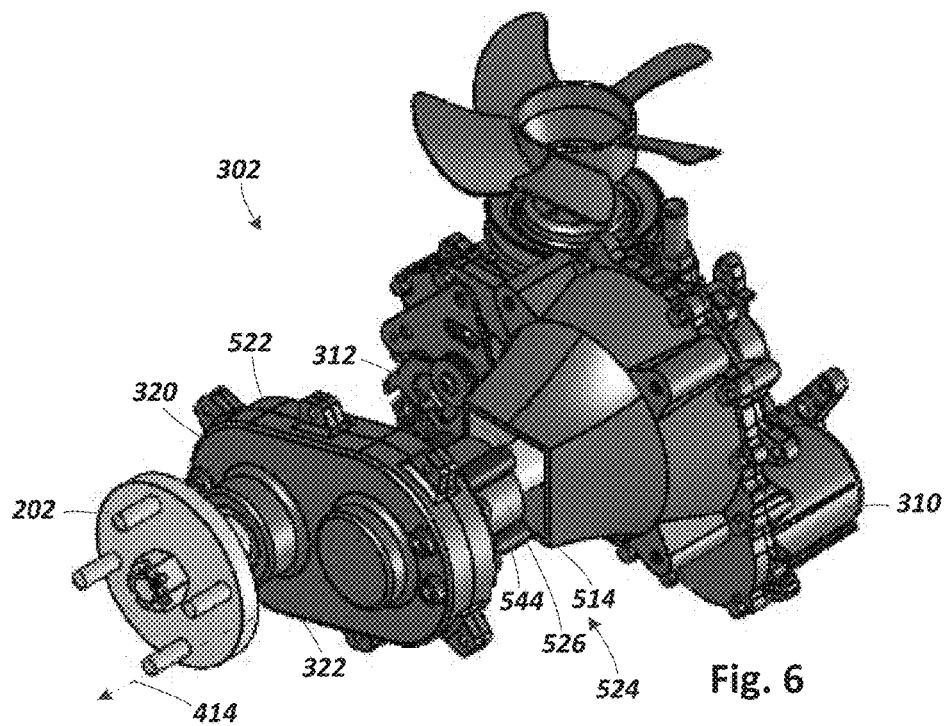
FIG. 6 is a schematic isometric view of one embodiment of the suspension assembly of FIG. 5 coupled to the wheel hub of FIG. 5 with the dropcase and the hydrostatic transmission of the suspension assembly partially separated from one another to show one embodiment of a pivotal-coupling assembly for pivotally coupling the dropcase to the hydrostatic transmission, according to the invention.

FIG. 6 illustrates, in isometric view, one embodiment of the suspension assembly 302 with the dropcase 320 partially separated from the hydrostatic transmission 310 to show one embodiment of the pivotal-coupling assembly 526 with the flange 526 disposed on the dropcase 320. As shown in FIG. 6, the drive-unit driveshaft 312 extends outwardly from the hydrostatic transmission 310, through the rectangular-shaped drive-unit output aperture 514, and into the dropcase 310, via the input aperture (532 in FIG. 5) defined in the flange 526. The blocks 544 are arranged around the flange 526 to coincide with corners of the rectangular-shaped drive-unit output aperture 514. When the dropcase 320 pivots about the pivot axis 414 relative to the hydrostatic transmission 310, the blocks 544 are compressed between the flange 526 and inner walls of the drive-unit output aperture 514. Thus, the compressibility of the blocks 544 determines the amount that the dropcase 320 can pivot relative to the hydrostatic transmission 310 which, in turn, regulates the amount of relative movement of the wheel hub 202 (when attached to the dropcase driveshaft 322) relative to the chassis (132 in FIG. 1) of the vehicle (102 in FIG. 1).

Turning to FIG. 9, the pivotal-coupling assembly 524 may include one or more other components in addition to, or in lieu of, the flange. In at least some embodiments, the pivotal-coupling assembly 524 includes one or more biasing elements, such as one or more springs (e.g., coiled, leaf, torsion, or the like or combinations thereof) attached the dropcase 320. The one or more biasing elements can be used to regulate the pivoting of the dropcase 320 relative to the hydrostatic transmission 310 about the pivot axis 414. The biasing element(s) can be coupled to the hydrostatic transmission 310. Alternately (or additionally), the biasing element(s) can be coupled to the chassis 132 of the vehicle (102 in FIG. 1).

In at least some embodiments, the pivotal-coupling assembly 524 includes one or more bearings for regulating pivot. The one or more bearings can be used in lieu of, or in addition to any of the other discussed components of the pivotal-coupling assembly 524. In at least some embodiments, the pivotal-coupling assembly 524 includes one or more dampers for dampening the pivot. The one or more dampers can be used in lieu of, or in addition to any of the other discussed components of the pivotal-coupling assembly 524.

FIG. 9 illustrates, in schematic side-elevational view, one embodiment of the second end portion 404 of the dropcase 320 coupled to the chassis 132 of the vehicle (102 in FIG. 1) via a coil-over spring-and-damper assembly 902. The coil-over spring-and-damper assembly 902 includes a coiled spring 904 disposed over a damper 906. The coil-over spring-and-damper assembly 902 shown in FIG. 9 is a one-piece assembly with the spring and damper being part of a single unit. In alternate embodiments, the spring and damper may be mounted to the dropcase 320 separately from one another.

Turning to FIGS. 7 and 8, it may, optionally, be desirable to dispose the dropcase of the suspension assembly in a rim of the wheel to which the wheel hub is attached. In some instances, disposing the dropcase in the rim of the wheel may enable the suspension assembly to have a narrower dimension along an axis perpendicular to the longitudinal axis 352 of the vehicle 102 (e.g., a width) (see e.g., FIG. 3A). In which case, disposing the dropcase in the rim of the wheel may enable the suspension assembly to be disposed in a vehicle that is narrower in width than embodiments of the suspension assembly where the dropcase is disposed medially to the wheel of the wheel hub to which it is coupled.

FIG. 7 illustrates, in bottom view, another embodiment of the suspension assembly 302 disposed in the lawnmower 102. The lawnmower 102 includes the wheel 162 that, in turn, includes the wheel hub 202 and a rim 702. In FIG. 7, the dropcase 320 is shown coupled to the wheel hub 202 and disposed in the rim 702. In some embodiments, the dropcase 320 is disposed partially in the rim 702. In other embodiments, the dropcase 320 is disposed entirely in the rim 702.

FIG. 8 illustrates, in side-elevational view, one embodiment of the dropcase 320 disposed in the rim 702. In at least some embodiments, when the dropcase 320 is disposed in the rim 702, the distance between along the dropcase 320 between the input aperture 532 and the output aperture 534 is less than a radius of the rim 702.

While the preferred embodiments of the invention have been illustrated and described, as noted above, many changes can be made without departing from the spirit and scope of the invention. Accordingly, the scope of the invention is not limited by the disclosure of the preferred embodiments. Instead, the invention should be determined entirely by reference to the claims that follow.

The embodiments of the invention in which an exclusive property or privilege is claimed are defined as follows:

1. A suspension assembly for a motorized vehicle comprising:
   a drive unit defining a drive-unit output aperture;
   a rotatable drive-unit driveshaft having a longitudinal length and a distal end portion extending outwardly from the drive unit through the drive-unit output aperture;
   an arm having a longitudinal length, a first portion, and a second portion spatially offset from the first end portion, the first portion of the arm pivotally coupled to the drive unit;
   an arm driveshaft having a first end portion and an opposing second end portion, the first end portion coupled to the drive-unit driveshaft such that rotation of the drive-unit driveshaft causes a corresponding rotation of the arm driveshaft, the second end portion extending outwardly from the second portion of the arm and configured and arranged to couple to a wheel hub, wherein the arm driveshaft is spatially offset from the drive-unit driveshaft along the longitudinal length of the arm; and
   a pivotal-coupling assembly pivotally coupling the arm to the drive unit, the pivotal-coupling assembly providing a pivot axis between the arm and the drive unit along the longitudinal length of the drive-unit driveshaft;
   wherein the drive-unit driveshaft and the arm driveshaft extend parallel to one another.

2. The suspension assembly of claim 1, wherein the drive unit is a hydrostatic transmission.

3. The suspension assembly of claim 1, wherein the arm comprises:
   a dropcase having an outer case enclosing the dropcase, the outer case having an outer surface;
   a dropcase input aperture defined in the outer case along the first portion of the dropcase, the dropcase input aperture receiving the distal end portion of the drive-unit driveshaft; and
   a dropcase output aperture defined in the outer case along the second portion of the dropcase;
   wherein the arm driveshaft extends through the dropcase output aperture.

4. A suspension assembly for a motorized vehicle comprising:
   a drive unit defining a drive-unit output aperture;
   a rotatable drive-unit driveshaft having a longitudinal length and a distal end portion extending outwardly from the drive unit through the drive-unit output aperture;
   an arm having a longitudinal length, a first portion, and a second portion spatially offset from the first end portion, the first portion of the arm pivotally coupled to the drive unit;
   an arm driveshaft having a first end portion and an opposing second end portion, the first end portion coupled to the drive-unit driveshaft such that rotation of the drive-unit driveshaft causes a corresponding rotation of the arm driveshaft, the second end portion extending outwardly from the second portion of the arm and configured and arranged to couple to a wheel hub, wherein the arm driveshaft is spatially offset from the drive-unit driveshaft along the longitudinal length of the arm; and
   a pivotal-coupling assembly pivotally coupling the arm to the drive unit, the pivotal-coupling assembly providing a pivot axis between the arm and the drive unit along the longitudinal length of the drive-unit driveshaft;
   wherein the arm comprises:
   a dropcase having an outer case enclosing the dropcase, the outer case having an outer surface;
   a dropcase input aperture defined in the outer case along the first portion of the dropcase, the dropcase input aperture receiving the distal end portion of the drive-unit driveshaft; and
   a dropcase output aperture defined in the outer case along the second portion of the dropcase;
   wherein the arm driveshaft extends through the dropcase output aperture;
   wherein the pivotal-coupling assembly comprises a flange projecting outwardly around one of the drive-unit output aperture and the dropcase input aperture, and wherein the input flange is pivotally received by the other of one of the drive-unit output aperture and the dropcase input aperture.

5. The suspension assembly of claim 4, further comprising at least one torsilastic molded block disposed between the flange and the one of the drive-unit output aperture and the dropcase input aperture pivotally receiving the pivotal-coupling flange, the at least one torsilastic block regulating the amount of pivot between the dropcase and the hydrostatic transmission about the pivot axis.

6. The suspension assembly of claim 1, wherein the drive-unit output aperture has an opening that is one of rectangular-shaped, triangular-shaped, and cruciform-shaped.

7. The suspension assembly of claim 1, wherein the pivotal-coupling assembly comprises at least one biasing element coupled to the arm and configured and arranged to couple to at least one of a hydrostatic transmission and a chassis of the motorized vehicle, the at least one biasing element regulating the amount of pivot between the arm and the hydrostatic transmission about the pivot axis.

8. The suspension assembly of claim 7, wherein the at least one biasing element comprises at least one of a coiled spring, a leaf spring, and a torsion spring.

9. The suspension assembly of claim 2, wherein the pivotal-coupling assembly further comprises at least one damper coupled to the arm, the at least one damper configured and arranged for dampening the pivot between the arm and the hydrostatic transmission about the pivot axis.

10. The suspension assembly of claim 1, further comprising a plurality of gears coupled to the arm, the plurality of gears comprising a first gear fixedly coupled to the drive-unit driveshaft and a second gear fixedly coupled to the arm driveshaft.

11. The suspension assembly of claim 10, wherein the first gear and the second gear have a 1:1 gear ratio such that one revolution of the first gear causes a corresponding one revolution of the second gear.

12. The suspension assembly of claim 1, wherein at least one of the drive-unit driveshaft and the arm driveshaft extends perpendicular to the longitudinal length of the arm.

13. A motorized vehicle having a longitudinal axis, the motorized vehicle comprising:
a chassis;
an engine coupled to the chassis;
a first wheel coupled to the chassis, the first wheel comprising
a first wheel hub coupled to the engine such that power generated by the engine turns the wheel hub, and
a rim coupled to the first wheel hub and configured and arranged to receive a tire; and
a suspension assembly comprising:
a drive unit defining a drive-unit output aperture;
a rotatable drive-unit driveshaft having a longitudinal length and a distal end portion extending outwardly from the drive unit through the drive-unit output aperture;
an arm having a longitudinal length, a first portion, and a second portion spatially offset from the first end portion, the first portion of the arm pivotally coupled to the drive unit;
an arm driveshaft having a first end portion and an opposing second end portion, the first end portion coupled to the drive-unit driveshaft such that rotation of the drive-unit driveshaft causes a corresponding rotation of the arm driveshaft, the second end portion extending outwardly from the second portion of the arm and configured and arranged to couple to a wheel hub, wherein the arm driveshaft is spatially offset from the drive-unit driveshaft along the longitudinal length of the arm; and
a pivotal-coupling assembly pivotally coupling the arm to the drive unit, the pivotal-coupling assembly providing a pivot axis between the arm and the drive unit along the longitudinal length of the drive-unit driveshaft;
wherein the arm is a dropcase and the arm driveshaft is a dropcase driveshaft;
wherein the first wheel hub is coupled to the second end portion of the dropcase driveshaft of the suspension assembly;
wherein the drive-unit driveshaft and the dropcase driveshaft extend parallel to one another.

14. The motorized vehicle of claim 13, wherein the dropcase of the suspension assembly is at least partially disposed within the rim of the first wheel.

15. The motorized vehicle of claim 13, wherein the dropcase of the suspension assembly is disposed entirely within the rim of the first wheel.

16. The motorized vehicle of claim 13, wherein the drive-unit driveshaft and the dropcase driveshaft each extend perpendicular to the longitudinal axis of the motorized vehicle.

17. The motorized vehicle of claim 13, wherein the suspension assembly is a first suspension assembly, and wherein the motorized vehicle comprises a second suspension assembly.

18. The motorized vehicle of claim 17, further comprising a second wheel coupled to the chassis, the second wheel comprising a second wheel hub, wherein the second suspension assembly is coupled to the second wheel hub.

19. The motorized vehicle of claim 13, wherein the motorized vehicle is a riding lawnmower.

* * * * *